United States Patent
Oh

(10) Patent No.: US 9,889,628 B2
(45) Date of Patent: Feb. 13, 2018

(54) LOW SPECIFIC GRAVITY AND HIGH STIFFNESS SANDWICH TYPE STEEL SHEET AND METHOD FOR MANUFACTURING THE SAME

(71) Applicant: Hyundai Motor Company, Seoul (KR)

(72) Inventor: Young-Hyun Oh, Kyounggi-do (KR)

(73) Assignee: Hyundai Motor Company, Seoul (KR)

( * ) Notice: Subject to any disclaimer, the term of this patent is extended or adjusted under 35 U.S.C. 154(b) by 251 days.

(21) Appl. No.: 14/505,883

(22) Filed: Oct. 3, 2014

(65) Prior Publication Data

US 2015/0140327 A1    May 21, 2015

(30) Foreign Application Priority Data

Nov. 18, 2013  (KR) .................. 10-2013-0139821

(51) Int. Cl.
| | | |
|---|---|---|
| B32B 7/00 | (2006.01) | |
| B32B 15/00 | (2006.01) | |
| B32B 7/12 | (2006.01) | |
| B32B 15/18 | (2006.01) | |
| B32B 38/16 | (2006.01) | |
| B32B 38/00 | (2006.01) | |
| B32B 15/08 | (2006.01) | |
| B32B 27/30 | (2006.01) | |
| B32B 27/32 | (2006.01) | |
| B32B 27/34 | (2006.01) | |
| B32B 37/24 | (2006.01) | |
| B32B 37/06 | (2006.01) | |

(52) U.S. Cl.
CPC ............. *B32B 7/12* (2013.01); *B32B 15/08* (2013.01); *B32B 15/18* (2013.01); *B32B 27/306* (2013.01); *B32B 27/32* (2013.01); *B32B 27/34* (2013.01); *B32B 38/162* (2013.01); *B32B 38/164* (2013.01); *B32B 37/06* (2013.01); *B32B 2037/243* (2013.01); *B32B 2250/03* (2013.01); *B32B 2250/40* (2013.01); *B32B 2255/06* (2013.01); *B32B 2270/00* (2013.01); *B32B 2307/306* (2013.01); *B32B 2307/51* (2013.01); *B32B 2307/546* (2013.01); *B32B 2307/554* (2013.01); *B32B 2307/558* (2013.01); *B32B 2307/584* (2013.01); *B32B 2307/718* (2013.01); *B32B 2309/02* (2013.01); *B32B 2309/04* (2013.01); *B32B 2309/12* (2013.01); *B32B 2311/00* (2013.01); *B32B 2311/30* (2013.01); *B32B 2323/00* (2013.01); *B32B 2377/00* (2013.01); *B32B 2605/00* (2013.01); *Y10T 428/269* (2015.01); *Y10T 428/31681* (2015.04)

(58) Field of Classification Search
None
See application file for complete search history.

(56) References Cited

U.S. PATENT DOCUMENTS

| | | | |
|---|---|---|---|
| 5,512,365 A | | 4/1996 | Miyazawa et al. |
| 2011/0200816 A1* | | 8/2011 | Mizrahi ............. B32B 15/02 |
| | | | 428/328 |

FOREIGN PATENT DOCUMENTS

| | | |
|---|---|---|
| JP | 3142554 B2 | 3/2001 |
| KR | 10-2008-0061731 A | 7/2008 |
| KR | 10-2011-0048052 A | 3/2011 |
| KR | 10-2013-0021283 A | 3/2013 |

* cited by examiner

*Primary Examiner* — Ana L Woodward
(74) *Attorney, Agent, or Firm* — Mintz Levin Cohn Ferris Glovsky and Popeo, P.C.; Peter F. Corless

(57) ABSTRACT

Disclosed is a sandwich type steel sheet having low specific gravity and high stiffness which may be applied to an exterior plate of a vehicle and the like, which require excellent strength, dent resistance and the like. Further, a method of manufacturing the sandwich type steel sheet having a low specific gravity and high stiffness is also disclosed. Particularly, the sandwich type steel sheet includes an upper steel sheet positioned at an upper portion; a lower steel sheet positioned at a lower portion; a polymer layer containing an amount of about 50 to 60 wt % of a polyamide 6 resin, an amount of about 25 to 45 wt % of a polyolefin resin, based on a total weight of the polymer layer. Therefore, the thickness of the steel sheets may be reduced by about 20% from the conventional steep sheet, and strength, dent resistance and the like may be enhanced. In addition, clunking, a slight noise of opening and closing doors, and the like, which are caused by a thin steel sheet and discomfort of a passenger by heavy rainy sound may be eliminated.

6 Claims, 1 Drawing Sheet

LOW SPECIFIC GRAVITY AND HIGH STIFFNESS SANDWICH TYPE STEEL SHEET AND METHOD FOR MANUFACTURING THE SAME

CROSS-REFERENCE TO RELATED APPLICATIONS

This application claims priority under 35 U.S.C. § 119 to Korean Patent Application No. 10-2013-139821, filed on Nov. 18, 2013, in the Korean Intellectual Property Office, the disclosure of which is incorporated herein by reference in its entirety.

TECHNICAL FIELD

The present invention relates to a sandwich type steel sheet which may have low specific gravity and high stiffness. The sandwich type steel sheet may be applied to an exterior plate of a vehicle and the like, which requires light weight and excellent strength, dent resistance and the like. Further, provided is a method for manufacturing the sandwich type steel sheet having low specific gravity and high stiffness. Particularly, the sandwich type steel sheet may include a polymer layer between two steel sheets.

BACKGROUND

As regulations on environmental contaminants such as $CO_2$ by the international community have been strengthened and the consumers' demand for a vehicle having high fuel efficiency and output power has increased, the vehicle industry has made significant efforts to develop vehicles with improved fuel efficiency, output, and safety.

Among such efforts, reducing the weight of the vehicle may be obtained by applying a high tensile strength steel sheet having high stiffness which has reduced thickness to the vehicle instead of using a thick common steel sheet for an exterior plate. Accordingly, fuel efficiency output and the like have been improved as well as the safety of the vehicle and the like due to characteristics of high-strength steel sheet.

Typically, the high tensile strength steel sheet applied to vehicles refers to a material having a tensile strength of about 340 MPa level or greater. However, clunking may be produced even at a small pressure exerted on the exterior plate of the vehicle, particularly when the thickness of the high tensile strength steel sheet applied to the exterior plate is reduce. Further, slight noise may be produced due to the thinned high tensile strength steel sheet when the door is opened and closed, and loud rainy sound and the like may be produced, so that significant amount of complaints from customers have been received. In addition, such problem may become greater as the thickness of the high tensile strength steel sheet is reduced.

As such, there is a need to develop a new steel sheet which may have reduced weight and improved strength than a high-tensile strength steel sheet in the related art, may provide solution to the problem of clunking, and also have improved dent resistance and the like, although effects of reducing weight in automobiles deteriorate when the thickness of the high tensile strength steel sheet becomes large.

In order to develop the new steel sheet, methods of laminating polymers between steel sheets have been developed. In the related arts, a multi-layer film and a laminate used in a printed circuit board has been reported and the multi-layer film and the laminate may include: a support layer containing a thermoplastic resin; an adhesive layer containing a polyolefin resin; a metal thin layer; and the like. However, such multi-layer film and laminate has been applied to a circuit substrate.

Moreover, in the related arts, a laminated sheet metal has been developed. The laminated sheet metal includes: a sheet metal; a thermoplastic resin film containing one or more films selected from the group consisting of a polyolefin resin film, a polyamide film, and the like; a primary resin layer; and the like. Although the sheet metal has enhanced corrosion resistance, it may not have sufficient strength for the use in a vehicle.

Accordingly, we now provide new laminated polymers and the like which is formed between steel sheets, thereby providing steel sheet with enhanced strength, reduced weight and the like.

The description provided above as a related art of the present invention is just merely for helping understanding of the background of the present invention and should not be construed as being included in the related art known by those skilled in the art.

SUMMARY OF THE INVENTION

The present invention provides a sandwich type steel sheet which may have low specific gravity and high stiffness and further have enhanced strength, dent resistance and reduced weight. The disclosed sandwich type steel sheet particularly includes a polymer layer which may include a polyamide 6 resin and a polyolefin resin and may be disposed between two steel sheets. In addition, a method for manufacturing the sandwich type steel is also disclosed.

In an exemplary embodiment of the present invention, a sandwich type steel sheet having low specific gravity and high stiffness may include: an upper steel sheet positioned at an upper portion; a lower steel sheet positioned at a lower portion; a polymer layer containing which may suitably contain an amount of about 50 to 60 wt % of a polyamide 6 resin based on the total weight of the polymer layer, and an amount of about 25 to 45 wt % of a polyolefin resin based on a the total weight of the polymer layer.

In certain exemplary embodiments, the upper steel sheet and the lower steel sheet may have a thickness of about 0.2 mm to about 0.3 mm.

In another certain exemplary embodiments, the polymer layer may have a thickness of about 0.3 mm to about 1.0 mm. The polymer layer may be formed by polymerizing the polyamide 6 resin and the polyolefin resin. In addition, the polyolefin resin may be a polyethylene resin, a polypropylene resin, a polybutadiene resin, or a derivative thereof. The polymer layer may further include ethylene vinyl acetate (EVA) and the like.

In other aspect, the sandwich steel sheet may be applied to an exterior plate of a vehicle.

In another aspect, provided is a method for manufacturing a sandwich type steel sheet having low specific gravity and high stiffness.

In an exemplary embodiment, the method may include steps of: a first step of washing one surface of each of an upper steel sheet and a lower steel sheet with methyl ethyl ketone (MEK) and the like to remove oil films formed on surfaces of the steel sheets, and drying the upper steel sheet and the lower steel sheet by a blowing process; a second step of applying a chrome-free solution on the dried surfaces of the upper steel sheet and the lower steel sheet to enhance adhesion strength with a polymer layer, and drying the upper steel sheet and the lower steel sheet by a blowing process;

a third step of laminating a polymer layer between the dried surfaces of the upper steel sheet and the lower steel sheet; a fourth step of temporarily adhering the upper steel sheet, the lower steel sheet, the laminated polymer layer to each other to form a sandwich type steel sheet through primary rolling; a fifth step of adhering the temporarily adhered sandwich type steel sheet by heating the sandwich type steel sheet in a heating furnace; a sixth step of bonding the adhered sandwich type steel sheet through secondary rolling; a seventh step of cooling the bonded sandwich type steel sheet in a cooling device.

In certain exemplary embodiments, the polymer may contain an amount of about 50 to 60 wt % of a polyamide 6 resin, an amount of about 25 to 45 wt % of a polyolefin resin based on a total weight of the polymer. The polymer may further contain ethylene vinyl acetate.

In yet certain exemplary embodiments, a heating temperature in the fifth step may be in a range of about 250° C. to about 350° C. Moreover, a heating time in the fifth step may be about 60 seconds to about 300 seconds.

In another certain exemplary embodiments, a secondary rolling pressure in the sixth step may be about in a range of about 5 bar to about 7 bar.

According to various exemplary embodiments, the present invention may provide advantageous effects by disposing a polymer layer having substantial stiffness between two steel sheets, which includes a polyamide amide 6 resin and a polyolefin resin. Accordingly, the thickness of the steel sheet may be reduced by about 20% from a conventional steel sheet, and strength and dent resistance thereof may be enhanced.

Furthermore, clunking, a slight noise of opening and closing doors, and the like which are caused by a conventional thin steel sheet having a thickness of the sandwich type steel sheet in the present invention and discomfort of a passenger by heavy rainy sound may be eliminated.

BRIEF DESCRIPTION OF THE DRAWINGS

The above and other objects, features and advantages of the present invention will be more clearly understood from the following detailed description taken in conjunction with the accompanying drawing, in which.

DETAILED DESCRIPTION

Figure 1:
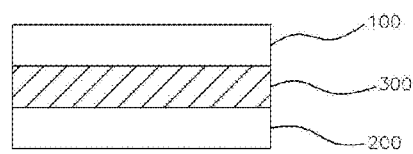
FIG. 1 is a cross-sectional view of an exemplary sandwich type steel sheet according to an exemplary embodiment the present invention.

Terms or words used in the present specification and claims should not be interpreted as being limited to typical or dictionary meanings, but should be interpreted as having meanings and concepts, which comply with the technical spirit of the present invention, based on the principle that an inventor can appropriately define the concept of the term to describe his/her own invention in the best manner.

For example, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail.

The present invention relates to a sandwich type steel sheet having low specific gravity and high stiffness and a method for manufacturing the sandwich type steel sheet.

In one aspect, the sandwich type steel sheet includes a strengthening polymer layer and the like disposed between two or more steel sheets in order to improve strength, dent resistance and the like and reduce the weight FIG. 1 is a cross-sectional view of an exemplary sandwich type steel sheet according to an exemplary embodiment of the present invention. As illustrated in FIG. 1, the sandwich type steel sheet may include an upper steel sheet 100 positioned at the upper portion and a lower steel sheet 200 positioned at the lower portion, and a polymer layer 300 disposed therebetween. In particular, the polymer layer may be a high stiffness polymer containing a polyamide 6 resin, a polyolefin resin and the like.

In certain exemplary embodiments, the thickness of the upper steel sheet 100 and the lower steel sheet 200 in the sandwich type steel sheet may be about 0.2 mm to about 0.3 mm, respectively, in consideration of strength, reduction in weight and the like. When the thickness of the steel sheet is less than about 0.2 mm, the strength of the steel sheet may decrease substantially, and when the thickness of the steel sheet is greater than about 0.3 mm, the weight may not be reduced substantially because the increase in weight is greater than the increase in strength. In particular, the steel sheet used herein may be a high tensile strength steel sheet having a tensile strength of about 340 MPa level or greater, or may be a typical steel sheet having a tensile strength less than about 340 MPa, without limitation.

The polymer layer 300 disposed between the steel sheets may reduce the weight of the sandwich type steel sheet according to exemplary embodiments of the present invention. Particularly, the polymer layer 300 may provide an emotionally improved comfort to a passenger, because clunking caused by a thin steel sheet, a slight noise during opening and closing doors, and a heavy rainy sound may be eliminated by the deposition of the polymer layer. Furthermore, strength, dent resistance and the like of the sandwich type steel sheet may be enhanced according to the types of steel sheet and the types of polymer disposed between the steel sheets.

In yet certain exemplary embodiments, the polymer layer 300 may be, but not limited to, a polymer composition containing a polyamide 6 resin, a polyolefin resin and the like. The polymer layer is formed by polymerizing a polyamide 6 resin, a polyolefin resin and the like. The polymer layer 300 may further contain ethylene vinyl acetate (EVA) and the like to enhance spreading properties of the polymer layer 300 and enhance adhesion strength when the upper steel sheet 100 and the lower steel sheet 200 are adhered to the polymer layer 300.

Meanwhile, the polyamide 6 resin as used herein may be a thermoplastic engineered plastic which is prepared by ring-opening polymerization of ε-caprolactam, and the like. Therefore, the polyamide 6 resin may provide enhanced mechanical properties such as elasticity, abrasion resistance and impact strength, excellent heat resistance and the like. In addition, a glass fiber and the like may be added to the polyamide 6 resin to substantially enhance tensile strength, heat resistance, and the like.

In certain exemplary embodiments, the polyamide 6 resin may be included in an amount of about 50 to about 60 wt % based on the total weight of the polymer layer. When the polyamide 6 resin is included in an amount less than about 50 wt %, the polymer layer may melt and flow in a high temperature process such as an electrodeposition process, since the melting point of the polymer layer decreases as the content of the polyamide 6 having excellent heat resistance decreases. When the polyamide 6 resin is included in an amount greater than about 60 wt %, hardness of the polymer layer containing the polyamide 6 may increase because the modulus is increased, but ductility, adhesion strength and the like of the polymer layer may decrease because of the relatively reduced content of the polyolefin resin.

The polyolefin resin as used herein may impart ductility to the polymer layer, and impart adhesion strength to the polymer layer when adhered to the steel sheet. Accordingly, an adhesive between the steel sheet and the polymer layer may not be used, bonding workability may be enhanced, and generation of poisonous gas may be reduced when fire breaks out. The polyolefin resin may be, but not limited to, a polyethylene resin, a polypropylene resin or a polybutadiene resin; or a derivative thereof.

In certain exemplary embodiments, the polyolefin resin may be included in an amount of about 25 to about 45 wt % based on the total weight of the polymer. When the polyolefin resin is included in an amount less than about 25 wt %, ductility and adhesion strength of the polymer may not be obtained substantially and a technical difficulty may occur during the molding. When the polyolefin resin is included in an amount greater than about 45 wt %, the relative content of the polyamide 6 resin may be reduced thereby deteriorating the heat resistance of the polymer layer.

In other certain exemplary embodiments, the thickness of the polymer layer 300 may be about 0.3 mm to about 1.0 mm. When the thickness is less than about 0.3 mm, strength against the upper steel sheet 100 and the lower steel sheet 200 may not be sufficiently supported, and clunking of the sandwich type steel sheet may occur. To the contrary, when the thickness is greater than about 1.0 mm and the thickness and weight of the sandwich type steel sheet increases, increase in strength and reduction in weight may not be substantially obtained.

In other aspect, the sandwich type steel sheet according to various exemplary embodiments of the present invention may be applied to the parts which require reduced weight, improved strength, dent resistance and the like. In particular, the sandwich type steel sheet according to the present invention may be applied to a vehicle part, such as an exterior plate of the vehicle.

Hereinafter, in another aspect, disclosed is a method for manufacturing the sandwich type steel sheet having low specific gravity and high stiffness. Particularly, the sandwich type steel sheet having low specific gravity and high stiffness according to exemplary embodiments of the present invention may be manufactured by laminating a polymer layer between two or more steel sheets; temporarily adhering the steel sheets to the laminated polymer layer through primary rolling; adhering the steel sheets to the laminated polymer layer by heating; completely bonding the assembly through secondary rolling; and subjecting the bonded assembly to a cooling process.

Figure 2:
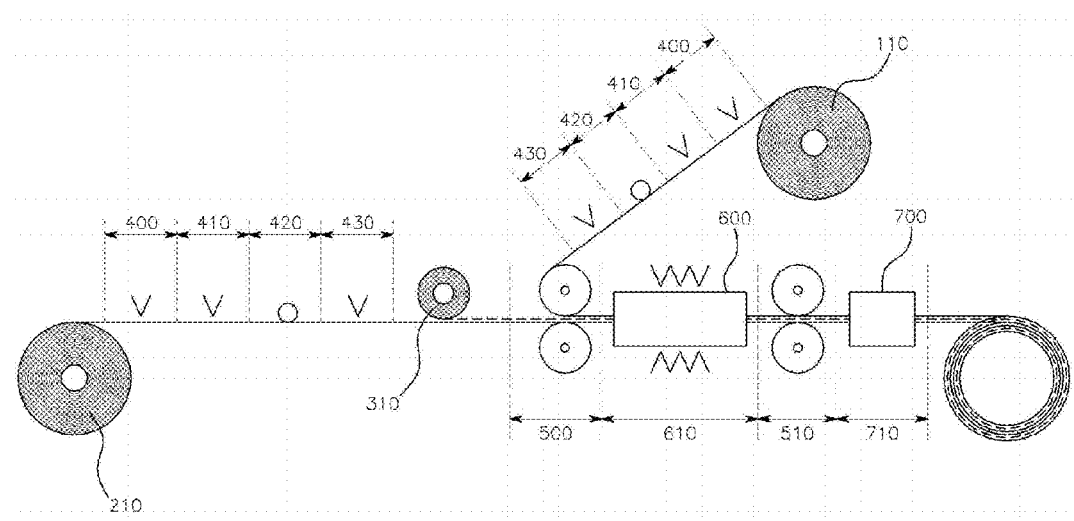
FIG. 2 is a schematic view of an exemplary method of manufacturing the sandwich type steel sheet according to an exemplary embodiment of the present invention.

FIG. 2 is a schematic view of an exemplary method for manufacturing the sandwich type steel sheet according to an exemplary embodiment of the present invention. In an exemplary embodiment, as described above in FIG. 2, the method of manufacturing a sandwich type steel sheet includes steps of: a first step of washing 400 one surface of each an upper steel sheet and a lower steel sheet with methyl ethyl ketone (MEK) to remove oil films formed on surfaces of the steel sheets, and drying 410 the upper steel sheet and the lower steel sheet by a blowing process; a second step of applying 420 a chrome-free solution on the dried surfaces of the upper steel sheet and the lower steel sheet to enhance adhesion strength with a polymer layer, and drying 430 the upper steel sheet and the lower steel sheet by a blowing process; a third step of laminating a polymer layer between the dried surfaces of the upper steel sheet and the lower steel sheet; a fourth step of temporarily adhering the upper steel sheet, the lower steel sheet, and the laminated polymer to form a sandwich type steel sheet through primary rolling 500; a fifth step of adhering the temporarily adhered sandwich type steel sheet by heating 610 the sandwich type steel sheet in a heating furnace 600; a sixth step of bonding the adhered sandwich type steel sheet through secondary rolling 510; a seventh step of cooling 710 the bonded sandwich type steel sheet in a cooling device 700.

In certain exemplary embodiments, the upper steel sheet may be produced from an upper steel sheet coil 110, the lower steel sheet may be produced from a lower steel sheet coil 210, and the polymer layer may be produced from a polymer coil 310.

In addition, the thickness of the upper steel sheet and the lower steel sheet mentioned in the manufacturing method may be about 0.2 mm to about 0.3 mm, and the thickness of the polymer layer laminated between the steel sheets may be about 0.3 mm to about 1.0 mm. In certain exemplary embodiments, the steel sheets including the upper steel sheet and the lower steel sheet may be, but not limited to, a high tensile strength steel sheet having a tensile strength of about 340 MPa level or greater, and may be a conventional steel sheet having a tensile strength less than about 340 MPa.

In certain exemplary embodiments, the polymer layer in the third step may be, without limitation, contain a polyamide 6 resin, a polyolefin resin and the like, and particularly the polymer layer in which a polyamide 6 resin, a polyolefin resin and the like may be polymerized.

The polyolefin resin may be, but not limited to, a typical polyolefin resin, or particularly a polyethylene resin, a polypropylene resin, a polybutadiene resin, or a derivative thereof. In addition, the polymer layer may further contain ethylene vinyl acetate in order to enhance spreading properties of the polymer layer and enhance adhesion strength when the upper steel sheets are adhered to the polymer layer.

In yet certain exemplary embodiments, the polyamide 6 resin and the polyolefin resin may be included in an amount of 50 to 60 wt % of the polyamide 6 resin and 25 to 45 wt % of the polyolefin resin based on the total weight of the polymer layer, and he ethylene vinyl acetate and the like may be included in the polymer layer in an amount of the remainder.

In the fifth step of the method, the heating temperature may be in a range of about 250° C. to about 350° C., and the heating time may be about 60 seconds to about 300 seconds. When the heating temperature is less than about 250° C., the polymer layer may not easily melt and adhesion defects to the steel sheet may occur. When the heating temperature is greater than about 350° C., the polymer may be modified at the highly elevated temperature, adhesion strength with the steel sheet may deteriorate due to substantial shrinkage of the polymer layer which may occur during the cooling, and further bending may occur on the surface of the steel sheet.

Furthermore, when the heating time is less than about 60 seconds, heat may not be sufficiently transmitted to the polymer layer and the polymer layer may not melt and adhesion defects with the steel sheet may occur. When the heating time is greater than about 300 seconds, the polymer layer may be modified due to rapid increase in temperature of the polymer layer caused by elongated heating time, adhesion strength of the polymer layer with the steel sheet may deteriorate due to substantial shrinkage which occurs during the cooling, and bending may occur on the surface of the steel sheet.

As an example, when the polymer layer is heated at about 300° C. for about 70 seconds, he polymer layer may be adhered to the steel sheet, since a polyamide 6 having a melting point of about 210° C. is melted. Further, when the heating temperature is about 250° C., the heating time may be about 300 seconds, and when the heating temperature is about 350° C., the heating time is preferably about 60 seconds. When the heating temperature is less than about 250° C. and the heating time is 300 or less seconds, or when the heating time is less than about 300 seconds even though the heating temperature is 250° C., the polymer layer may not melt and the polymer layer may not bond to the steel sheet. When the heating temperature is greater than about 350° C., or when the heating time is greater than about 60 seconds while the heating temperature is 350° C., during the time when the bonded sandwich steel sheet is cooled, rapid cooling may occur by the significant difference between the heating temperature and cooling temperature so that bending may occur on the surface of the sandwich type steel sheet.

In certain exemplary embodiments, a secondary rolling pressure in the sixth step may be in a range of about 5 bar to about 7 bar, and or particularly of about 6 bar. When the rolling pressure is less than about 5 bar, the polymer layer and the steel sheet may not be sufficiently bonded. When the rolling pressure is greater than about 7 bar, the thickness of the polymer layer may be substantially reduced due to elevated pressure exerted on the polymer layer disposed between the steel sheets, and the strength of the sandwich type steel sheet may decrease.

Therefore, the sandwich type steel sheet manufactured by the method according to the various exemplary embodiments of the present invention may be used to reduce the weight and the like and improve the strength, dent resistance and the like. In particular, the sandwich type steel sheet manufactured by the manufacturing method may be applied to a vehicle and the like, and more particularly to an exterior plate for the vehicle.

Example

Hereinafter, the present invention will be described in more detail through the Examples. These Examples are only for illustrating the present invention, and it will be obvious to those skilled in the art that the scope of the present invention is not interpreted to be limited by these Examples.

In Table 1, the strength, dent resistance and weight of the Examples manufactured according to exemplary manufacturing method of the present invention are summarized in comparison to the Comparative Examples. In Table 2, the compositions of the polymer layer included in the sandwich type steel sheets in the Examples and the Comparative Examples according to the present invention are provided. The adhesion strength test results of the polymer layers and the steel sheet according to the heating time of the manufacturing process are also summarized in Table 2.

TABLE 1

| Classification | Unit | Example 1 | Example 2 | Example 3 | Comparative Example 1 | Comparative Example 2 |
|---|---|---|---|---|---|---|
| Thickness of steel sheet | mm | 0.7 (Polymer 0.3) | 0.75 (Polymer 0.3) | 0.8 (Polymer 0.4) | 0.65 | 0.7 |
| Steel sheet strength (modified amount) | mm | 8.2 | 6.3 | 5.0 | 6.6 | 5.6 |
| Dent resistance | kgf | 12.3 | 14.0 | 15.0 | 13.7 | 14.7 |
| Weight | kg | 0.85 | 0.96 | 1.06 | 1.23 | 1.32 |

In Table 1, dent resistances and weights are compared according to the thickness of the steel sheet of the Examples and the Comparative Examples. In Examples 1 to 3, a sandwich type steel sheet is applied, and in Comparative Examples 1 and 2, a typical steel sheet is applied.

Particularly, since the total thickness of the sandwich type steel sheet was about 0.7 mm, but the thickness of the polymer layer included in the sandwich steel sheet was about 0.3 mm in Example 1, the sum of thicknesses of the other upper steel sheet and lower steel sheet was about 0.4 mm.

In this case, in Example 1 and Comparative Example 2 with the same thickness, the steel sheet was included in a less amount by about 43% in Example 1 than in Comparative Example 2, and strength increased in Example 1 by about 46% from that in Comparative Example 2. However, dent resistance was decreased by only about 16%, and weight was reduced in Example 1 by about 35% than in Comparative Example 2.

Accordingly, in Example 1, although the total thickness was the same as that in Comparative Example 2, the amount of the steel sheet included in the Example 1 was less than that in Comparative Example 2 so that the steel sheet had reduced weight and improved strength. However, when Example 3 was compared with Comparative Example 2, the thickness of the polymer in Example 3 was about 0.4 mm and the sum of thicknesses of the upper steel sheet and the lower steel sheet was about 0.4 mm, and thus, the total thickness of 0.8 mm was larger than 0.7 mm, which was the total thickness of Comparative Example 2.

However, in Example 3, the thickness of the steel sheet was reduced by about 43% from that in Comparative Example 2, but strength was improved by about 10%, dent resistance was improved by about 2%, and weight was reduced by about 20% from those in Comparative Example 2.

As such, since strength of the steel sheet had to do with the thickness, the steel sheet was included in a less amount in Example 3 in which the steel sheet was light and thick, and improved strength and dent resistance may be obtained while the weight of the steel sheet was reduced.

TABLE 2

| Classification | Unit | Example 4 | Comparative Example 3 | Comparative Example 4 | Comparative Example 5 |
|---|---|---|---|---|---|
| Polyamide 6 | wt % | 55 | 70 | 40 | 30 |
| Polyolefin | wt % | 30 | 20 | 50 | 60 |
| EVA | wt % | Remainder | Remainder | Remainder | Remainder |
| Adhesion strength | — | Fair | Peeling-off occurs | Melted at 150° C. | Melted at 110° C. |

In Table 2, the adhesion strengths of the steel sheet with the polymer layers are shown in comparison of the Examples and Comparative Examples according to the content of the polymer layer included in the sandwich type steel sheet. When the content of the polyamide 6 resin of Example 4 is within a range in an exemplary embodiment of the present invention in Table 2, the adhesion strength of the polymer layer with the steel sheet was sufficient. When the content of the polyamide 6 resin is greater than the predetermined range in the present invention like in Comparative Example 3, the content of polyolefin which may impart ductility to the polymer layer decreased, so that the polymer layer may be separated from the steel sheet during the molding process due to the lack of ductility of the sandwich type steel sheet.

On the contrary, in the Comparative Example 4, when the content of the polyamide 6 resin is less than the predetermined range in the present invention, heat resistance of the polymer layer may deteriorate so that the polymer layer may melt at about 150° C. Thus, when an electrodeposition process and the like are performed at a temperature of about 200° C. for about 20 minutes, the polymer may melt so that the electrodeposition process becomes defective.

Since the content of the polyamide 6 resin in the Comparative Example 5 is less than that in the Comparative Example 4, heat resistance of the polymer layer may further deteriorate so that the polymer may melt at a temperature of about 110° C. Accordingly, when the content of the polymer layer is in the predetermined range as described in the present invention such as in Example 4, adhesion strength of the polymer with the steel sheet in the sandwich type steel sheet may be sufficiently improved.

TABLE 3

| Classification | Unit | Example 5 | Comparative Example 6 | Comparative Example 7 |
|---|---|---|---|---|
| Heating temperature | ° C. | 300 | 300 | 300 |
| Heating time | Second | 150 | 60 | 300 |
| Pressure | Bar | 6 | 6 | 6 |
| Adhesion strength and appearance quality | — | Fair | Bonding could not be achieved because the polymer was not melted | Bonding could be achieved, but bending occurred on the surface of the steel sheet because rapid cooling was caused |

In Table 3, adhesion strength test results of the polymer layer and the steel sheet are compared according to the heating time in the heating furnace during the process of passing the temporarily adhered sandwich steel sheet in the fifth step to bond the sandwich steel sheet in an exemplary manufacturing method of the present invention.

When the temporarily adhered sandwich steel sheet is heated at a temperature of about 300° C. in the heating furnace for about 70 seconds, the polymer layer in the sandwich steel sheet in Example 5 may melt so that the polymer layer may be bonded to the adjacent steel sheet because the temperature of the sandwich steel sheet reached about 210° C. at which a polyamide 6 resin may melt However, when the temporarily adhered sandwich steel sheet is heated at a temperature of about 300° C. for about 60 seconds as in the Comparative Example 6, the temperature of the steel sheet may fail to reach about 210° C., so that the polymer may not be bonded to the steel sheet because the polymer layer may not melt.

In contrast, when the temporarily adhered sandwich steel sheet is heated at a temperature of about 300° C. for about 300 seconds as in the Comparative Example 7, the temperature of the steel sheet significantly may be elevated over about 210° C., and there may be substantial difference between the temperature and cooling temperature, so that bending may occur on the surface of the bonded sandwich steel sheet due to rapid cooling.

As described above, the present invention has been described in relation to exemplary embodiments of the present invention, but the exemplary embodiments are only illustration and the present invention is not limited thereto. The embodiments described may be changed or modified by those skilled in the art to which the present invention pertains without departing from the scope of the present invention, and various alterations and modifications are possible within the technical spirit of the present invention and the equivalent scope of the claims to be described below.

What is claimed is:

1. A sandwich type steel sheet, comprising:
   an upper steel sheet positioned at an upper portion;
   a lower steel sheet positioned at a lower portion; and
   a polymer layer which is disposed between the upper steel sheet and the lower steel sheet and comprises an amount of about 50 to 60 wt % of polyamide 6 resin, an amount of about 25 to 45 wt % of a polyolefin resin, wherein each said wt % is based on the total weight of the polymer layer, wherein the polymer layer contains a polymer formed by polymerizing the polyamide 6 resin and the polyolefin resin, and wherein the polymer is a copolymerization product of the polyamide 6 resin and the polyolefin resin.

2. The sandwich type steel sheet of claim 1, wherein the upper steel sheet or the lower steel sheet has a thickness of about 0.2 mm to 0.3 mm.

3. The sandwich type steel sheet of claim 1, wherein the polymer layer has a thickness of about 0.3 mm to 1.0 mm.

4. The sandwich type steel sheet of claim 1, wherein the polyolefin resin is a polyethylene resin, a polypropylene resin, or a polybutadiene resin.

5. The sandwich type steel sheet of claim 1, wherein the polyolefin resin comprises ethylene vinyl acetate (EVA).

6. An outer plate for an automobile manufactured with the sandwich type steel sheet of claim 1.

* * * * *